United States Patent
Wang et al.

(10) Patent No.: US 11,792,055 B2
(45) Date of Patent: Oct. 17, 2023

(54) TERMINAL AND BASE STATION IN WIRELESS COMMUNICATION SYSTEM

(71) Applicant: NTT DOCOMO, INC., Tokyo (JP)

(72) Inventors: Xin Wang, Beijing (CN); Jing Wang, Beijing (CN); Xiaolin Hou, Beijing (CN); Lan Chen, Beijing (CN); Anxin Li, Beijing (CN); Takahiro Asai, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 253 days.

(21) Appl. No.: 16/737,792

(22) Filed: Jan. 8, 2020

(65) Prior Publication Data

US 2020/0366537 A1 Nov. 19, 2020

(30) Foreign Application Priority Data

May 17, 2019 (CN) .......................... 201910417984.6

(51) Int. Cl.
*H04L 25/03* (2006.01)
*G06N 3/08* (2023.01)

(52) U.S. Cl.
CPC ......... *H04L 25/03955* (2013.01); *G06N 3/08* (2013.01)

(58) Field of Classification Search
CPC .......... G06N 3/0454; G06N 3/06; G06N 3/08; H04B 7/0413; H04W 16/10; H04W 16/14; H04W 24/02
USPC .......................................................... 370/252
See application file for complete search history.

(56) References Cited

U.S. PATENT DOCUMENTS

| | | | | |
|---|---|---|---|---|
| 6,006,091 A | * | 12/1999 | Lupien | H04W 8/20 455/435.1 |
| 2005/0060010 A1 | * | 3/2005 | Goetz | A61N 1/3605 607/48 |
| 2010/0232374 A1 | * | 9/2010 | Ofuji | H04W 72/542 370/329 |
| 2014/0329540 A1 | * | 11/2014 | Duggan | H04W 4/029 455/456.1 |
| 2019/0049912 A1 | | 2/2019 | Poornachandran et al. | |
| 2020/0187021 A1 | * | 6/2020 | Shanmugaraju | H04L 1/203 |
| 2020/0333424 A1 | * | 10/2020 | Shi | H04W 4/02 |
| 2021/0351885 A1 | * | 11/2021 | Chavva | G06N 3/04 |

OTHER PUBLICATIONS

Office Action issued in counterpart Chinese Patent Application No. 201910417984.6 dated Jul. 6, 2023 (13 pages).

* cited by examiner

*Primary Examiner* — Christopher M Crutchfield
*Assistant Examiner* — Jean F Voltaire
(74) *Attorney, Agent, or Firm* — Osha Bergman Watanabe & Burton LLP

(57) ABSTRACT

The present disclosure provides a terminal and a base station in a wireless communication system. The terminal may include a control unit configured to input a downlink channel to a neural network of the terminal; and the control unit further configured to control the neural network of the terminal to process the input and output feedback information.

7 Claims, 7 Drawing Sheets

TERMINAL AND BASE STATION IN WIRELESS COMMUNICATION SYSTEM

CROSS-REFERENCE TO RELATED APPLICATIONS

This application claims the benefit and priority of Chinese Application No. 201910417984.6, filed May 17, 2019. The entire disclosure of the above application is incorporated herein by reference.

TECHNICAL FIELD

The present disclosure relates to a field of wireless communication, and in particular, to a terminal and a base station in a wireless communication system.

BACKGROUND

With the development of science and technology, artificial intelligence (AI) technology has been applied to a variety of fields, such as a field of image processing, a field of semantic recognition, and a field of medical. It is envisaged that in the future, AI technology may also be applied to a field of wireless communication, so as to provide users with wireless communication services more intelligently.

When AI technology is applied to the field of wireless communication, a base station or a terminal in a wireless communication system may support an AI function (for example, deployed with an artificial neural network). In this case, an information interaction process between the base station and the terminal may change due to the AI function. For example, a feedback process from the terminal to the base station may change due to the AI function. In addition, a codebook used when the base station and the terminal communicate may also change due to the AI function.

SUMMARY OF THE INVENTION

For this purpose, the present disclosure proposes a method performed by a terminal and a corresponding terminal, and a method performed by a base station and a corresponding base station.

According to an aspect of the present disclosure, there is provided a terminal comprising: a control unit configured to input a downlink channel to a neural network of the terminal; and the control unit further configured to control the neural network of the terminal to process the input and output feedback information.

According to an example of the present disclosure, the terminal further comprises a transmitting unit configured to transmit the feedback information to a base station.

According to an example of the present disclosure, the transmitting unit is configured to quantize the feedback information by using a neural network-based codebook, and transmit quantized feedback information to the base station.

According to an example of the present disclosure, the transmitting unit is configured to encode and modulate the feedback information, and transmit the encoded and modulated feedback information to the base station.

According to an example of the present disclosure, the transmitting unit is configured to perform analog modulation on the feedback information, and transmit the analog modulated feedback information to the base station.

According to another aspect of the present disclosure, there is provided a base station comprising: a receiving unit configured to receive feedback information from a terminal; and a control unit configured to determine an input of a specific layer in a neural network of the base station according to the feedback information.

According to an example of the present disclosure, the control unit is configured to control a specific layer in the neural network of the base station to process the feedback information, and output transmission configuration information for the terminal.

According to another aspect of the present disclosure, there is provided a terminal comprising: a receiving unit configured to receive indication information on codebooks from a base station, wherein the indication information indicates whether the terminal uses neural network-based codebooks; and a control unit configured to determine whether to use the neural network-based codebooks according to the indication information.

According to an example of the present disclosure, the terminal further includes a transmitting unit configured to transmit information on characteristics of the neural network of the terminal to the base station.

According to an example of the present disclosure, the information on characteristics of the neural network of the terminal includes information about at least one of a network type and a network size of the neural network of the terminal.

According to an example of the present disclosure, the neural network-based codebooks are related to the characteristics of the neural network.

According to an example of the present disclosure, the neural network-based codebooks are determined according to output characteristics of the neural network.

According to another aspect of the present disclosure, there is provided a base station comprising: a control unit configured to determine indication information on codebooks, wherein the indication information indicates whether a terminal uses neural network-based codebooks; and a transmitting unit configured to transmit the indication information to the terminal.

According to an aspect of the present disclosure, there is provided a method performed by a terminal is provided. The method comprises: inputting a downlink channel to a neural network of the terminal; and processing the input by the neural network of the terminal and outputting feedback information.

According to an example of the present disclosure, the method further comprises transmitting feedback information to a base station.

According to an example of the present disclosure, the transmitting feedback information to a base station includes quantizing the feedback information by using a neural network-based codebook, and transmitting the quantized feedback information to the base station.

According to an example of the present disclosure, the transmitting feedback information to a base station includes encoding and modulating the feedback information, and transmitting the encoded and modulated feedback information to the base station.

According to an example of the present disclosure, the transmitting feedback information to a base station includes performing analog modulation on the feedback information, and transmitting the analog modulated feedback information to the base station.

According to one aspect of the present disclosure, there is provided a method performed by a base station. The method comprises: receiving feedback information from a terminal;

and determining an input of a specific layer in a neural network of the base station according to the feedback information.

According to an example of the present disclosure, the method further comprises processing the feedback information by the specific layer in the neural network of the base station, and outputting transmission configuration information for the terminal.

According to another aspect of the present disclosure, there is provided a method performed by a terminal. The method comprises: receiving indication information on codebooks from a base station, wherein the indication information indicates whether the terminal uses neural network-based codebooks; and determining whether to use the neural network-based codebooks according to the indication information.

According to an example of the present disclosure, the method further comprises transmitting information on characteristics of the neural network of the terminal to the base station.

According to an example of the present disclosure, the information on characteristics of the neural network of the terminal includes information about at least one of a network type and a network size of the neural network of the terminal.

According to an example of the present disclosure, wherein the neural network-based codebooks are related to the characteristics of the neural network.

According to an example of the present disclosure, the neural network-based codebooks are determined according to output characteristics of the neural network.

According to another aspect of the present disclosure, there is provided a method performed by a base station. The method comprises: determining indication information on codebooks, wherein the indication information indicates whether a terminal uses neural network-based codebooks; and transmitting the indication information to the terminal.

With the method performed by the terminal and the corresponding terminal, and the method performed by the base station and the corresponding base station, the base station may receive the feedback information from the terminal, which is obtained by the terminal performing the channel estimation on the downlink channel by using its own neural network, so that the feedback information may be used as the input of the specific layer in the neural network of the base station, thereby facilitating the base station to determine the transmission configuration information for the terminal. In addition, with the method performed by the terminal and the corresponding terminal, and the method performed by the base station and the corresponding base station, the terminal may determine whether to use the neural network-based codebook with the indication from the base station, thereby making the communication between the base station and the terminal more intelligent and efficient.

BRIEF DESCRIPTION OF THE DRAWINGS

The above as well as other objects, features and advantages of the present disclosure will become more apparent by a more detailed description of embodiments of the present disclosure in conjunction with the accompanying drawings. The accompanying drawings are intended to provide a further understanding of the embodiments of the present disclosure, and form a part of the specification. The accompanying drawings are used to construct the present disclosure together with the embodiments of the present disclosure, and are not intended to limit the present disclosure. In the accompanying drawings, the same reference numerals generally refer to the same components or steps.

DESCRIPTION OF THE EMBODIMENTS

Figure 1A:
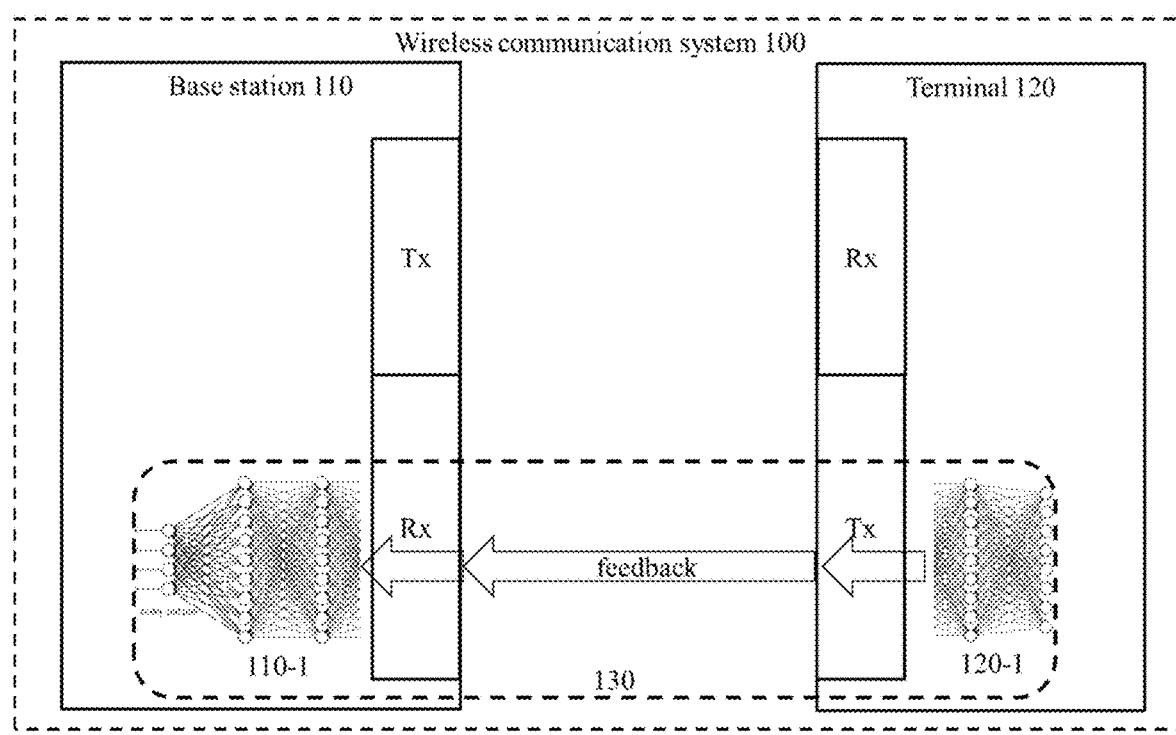
FIG. 1A is a schematic diagram of a wireless communication system in which the embodiments of the present disclosure may be applied.

In order to make the objects, the technical solutions and the advantages of the present invention more apparent, exemplary embodiments according to the present disclosure will be described in detail below with reference to the accompanying drawings. The same reference numerals denote the same elements throughout the accompanying drawings. It should be understood that the embodiments described herein are merely illustrative and should not be construed as limiting the scope of the disclosure. In addition, terminals described herein may include various types of terminals, such as user equipment (UE), mobile terminals (or mobile stations), or fixed terminals. However, for convenience, the terminal and UE are sometimes used interchangeably in the following.

First, a wireless communication system in which the embodiments of the present disclosure may be applied is described with reference to FIGS. 1A-1B. The wireless communication system may be a 5G system, or any other type of wireless communication system, such as a Long Term Evolution (LTE) system or an LTE-A (advanced) system, and the like. Hereinafter, the embodiments of the present disclosure are described by using the 5G system as an example, but it should be noted that the following description may also be applied to other types of wireless communication systems.

FIG. 1A is a schematic diagram of a wireless communication system in which the embodiments of the present disclosure may be applied. As shown in FIG. 1A, the wireless communication system 100 may include a base station 110 and a terminal 120. The base station 110 is a serving base station for the terminal 120. The base station 110 may transmit signals to the terminal 120, and accordingly, the terminal 120 may receive signals from the base station 110. In addition, the terminal 120 may transmit signals (for example, feedbacks) to the base station 110, and accordingly, the base station 110 may receive signals from the terminal 120. The terminal 120 may be configured with an artificial intelligence-enabled signal processor 120-1 (for example, a signal encoder), so as to process the signals transmitted to the base station 110 with the artificial intelligence. Accordingly, the base station 110 may be configured with an artificial intelligence-enabled signal processor 110-1 (for example, a signal decoder) corresponding to the terminal 120, so as to process the signals received from the terminal 120 with the artificial intelligence.

The above artificial intelligence may be artificial intelligence implemented in any manner. For example, it may be artificial intelligence implemented with an artificial neural network (hereinafter referred to as "neural network"). In the present disclosure, the present disclosure is described by using an example of implementing the artificial intelligence with the neural network. In the example of implementing the artificial intelligence with the neural network, the wireless communication system 100 may deploy one neural network 130. The artificial intelligence-enabled signal processor 120-1 on the terminal 120 side may be a part of the neural network 130, and the artificial intelligence-enabled signal processor 110-1 on the base station 110 side may be the remaining part of the neural network 130. For example, the neural network 130 may include one input layer, a plurality of intermediate layers (also referred to as "hidden layers"), and one output layer. Then, some layers of the neural network 130 may be deployed in the terminal 120, and the remaining layers of the neural network 130 may be deployed in the base station 110. For example, the input layer and part of the intermediate layers of the neural network 130 may be deployed in the terminal 120, and the remaining intermediate layers and the output layer of the neural network 130 may be deployed in the base station 110. In addition, the part of the neural network deployed in the terminal 120 may be referred to as the neural network 120-1 of the terminal 120, and the part of the neural network deployed in the base station 110 may be referred to as the neural network 110-1 of the base station 110. Therefore, the input layer of the neural network 130 is the input layer of the neural network 120-1, and the last intermediate layer among the part of the intermediate layers of the neural network 130 is the output layer of the neural network 120-1. And, the first intermediate layer among the remaining intermediate layers of the neural network 130 is the input layer of the neural network 110-1, and the output layer of the neural network 130 is the output layer of the neural network 110-1.

In addition, the output of the neural network 120-1 of the terminal 120 may be fed back to the base station 110 and used as an input to a specific layer in the neural network 110-1 of the base station 110, so that the base station 110 determines transmission configuration information for the terminal 120 (for example, one or more of transmission beams, the number of transmission streams, resources, encoding and modulation schemes, transmission antennas, transmission ports, or transmission modes for the terminal 120 and so on).

The above FIG. 1A describes a schematic diagram in which the terminal feeds back the output of its neural network to the base station in the wireless communication system. In addition, in the wireless communication system, the base station may also feed back the output of its neural network to the terminal. A schematic diagram in which the base station feeds back the output of its neural network to the terminal in the wireless communication system will be described below with reference to FIG. 1B. FIG. 1B is another schematic diagram of the wireless communication system in which the embodiments of the present disclosure may be applied.

Figure 1B:
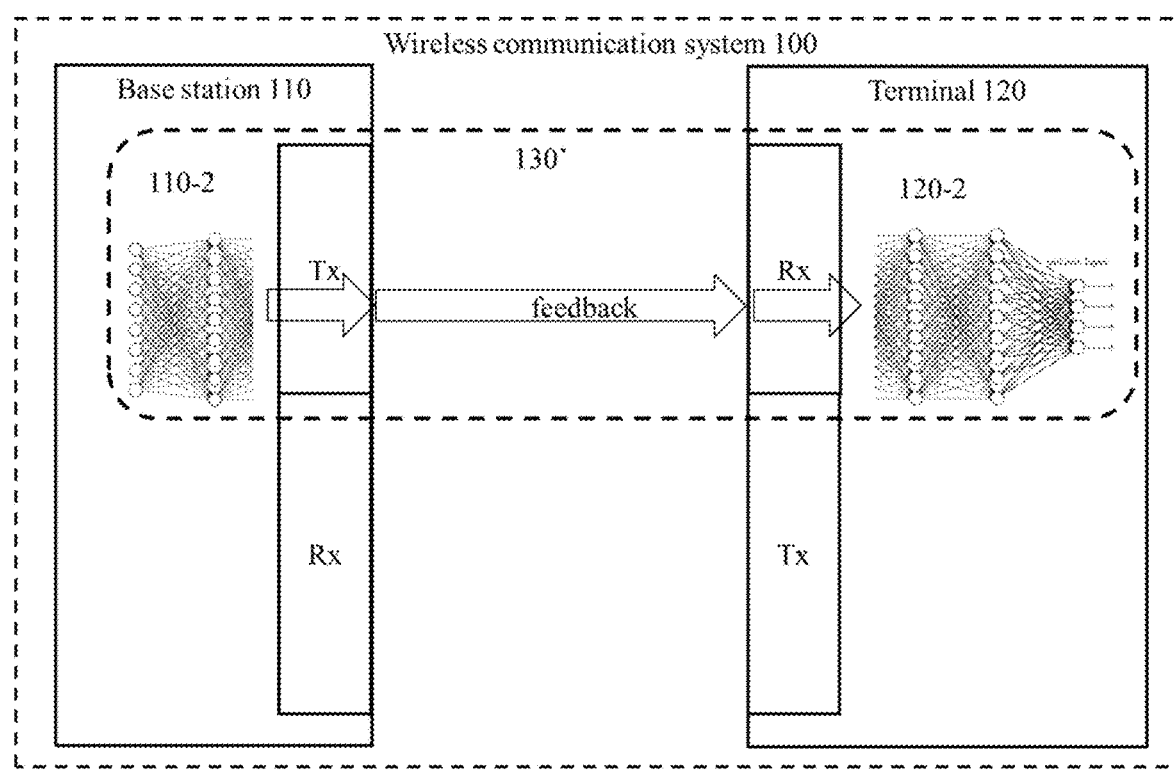
FIG. 1B is another schematic diagram of a wireless communication system in which the embodiments of the present disclosure may be applied.

As shown in FIG. 1B, the base station 110 may be configured with an artificial intelligence-enabled signal processor 110-2 (for example, the signal encoder), so as to process signals transmitted to the terminal 120 with the artificial intelligence. Accordingly, the terminal 120 may be configured with an artificial intelligence-enabled signal processor 120-2 (for example, the signal decoder) corresponding to the base station 110, so as to process signals received from the base station 110 with the artificial intelligence.

In an example of implementing artificial intelligence with the neural network, the wireless communication system 100 may deploy one neural network 130'. The artificial intelligence-enabled signal processor 110-2 on the base station 110 side may be a part of the neural network 130', and the artificial intelligence-enabled signal processor 120-2 on the terminal 120 side may be the remaining part of the neural network 130'. For example, the neural network 130' may include one input layer, a plurality of intermediate layers (also referred to as "hidden layers"), and one output layer. Then, some layers of the neural network 130' may be deployed in the base station 110, and the remaining layers of the neural network 130' may be deployed in terminal 120. For example, the input layer and part of the intermediate layers of the neural network 130' may be deployed in the base station 110, and the remaining intermediate layers and the output layer of the neural network 130' may be deployed in the terminal 120. In addition, the part of the neural network deployed in the base station 110 may be referred to as the neural network 110-2 of the base station 110, and the part of the neural network deployed in the terminal 120 may be referred to as the neural network 120-2 of the terminal 120. Therefore, the input layer of the neural network 130' is the input layer of the neural network 110-2, and the last intermediate layer among the part of intermediate layers of the neural network 130' is the output layer of the neural network 110-2. And, the first intermediate layer among the remaining intermediate layers of the neural network 130' is the input layer of the neural network 120-2, and the output layer of the neural network 130' is the output layer of the neural network 120-2.

In addition, the output of the neural network 110-2 of the base station 110 may be fed back to the terminal 120 and used as an input to a specific layer in the neural network 110-2 of the terminal 120, so that the terminal 120 determines feedback information for transmitting to the base station 110.

With the above neural network 130 and neural network 130', one recurrent neural network (or may also be referred as a recursive neural network) may be formed in the wireless communication system 100. In addition, for the neural networks 110-1 and 110-2 in the base station 110, the output of a specific layer in the neural network 110-1 may be used as the input of the neural network 110-2, and/or the output of a specific layer in the neural network 110-2 may be used as the input of neural network 110-1. Similarly, for the neural networks 120-1 and 120-2 in the terminal 120, the output of a specific layer in the neural network 120-1 may be used as the input of the neural network 120-2, and/or the output of a specific layer in the neural network 120-2 may be used as the input of the neural network 120-1.

Figure 2:
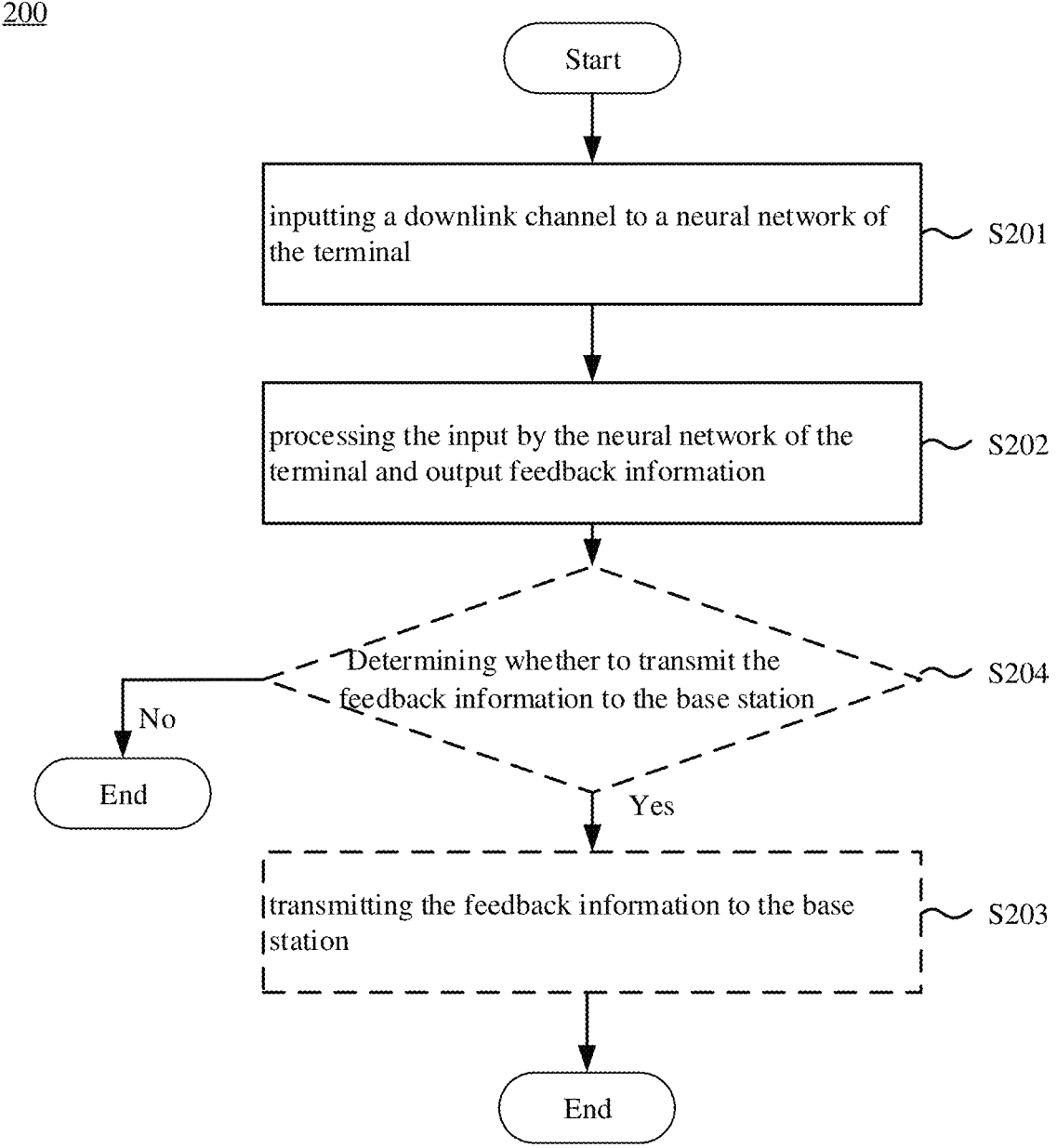
FIG. 2 is a flowchart of a method performed by a terminal according to the embodiments of the present disclosure.

In addition, it should be noted that although one base station, one terminal, and one neural network are shown in FIGS. 1A and 1B, respectively, this is only schematic, and the wireless communication system may include a plurality of base stations, and/or a plurality of terminals, and/or a plurality of neural networks, and accordingly, the wireless communication system may include a plurality of cells. In addition, in the following, cells and base stations are sometimes used interchangeably. Hereinafter, a process in which the terminal feeds back the output of its neural network to the base station according to the embodiments of the present disclosure will be described with reference to FIG. 2. FIG. 2 is a flowchart of a method 200 performed by the terminal according to the embodiments of the present disclosure. As shown in FIG. 2, in step S201, the terminal inputs a downlink channel to the neural network of the terminal. For example, the terminal may input time-frequency resources (for example, resource blocks) corresponding to the downlink channel to a specific layer of the neural network of the terminal, such as the input layer, the intermediate layers, etc., thereby inputting signals on the downlink channel to the specific layer of the neural network of the terminal. The "signals on the downlink channel" herein may be any received signals used to estimate the downlink channel, for example, Reference Signals (RSs) on a downlink control channel, service data on a downlink data channel and/or demodulation reference signals (DMRSs) to be described below. In addition, the neural network of the terminal in step S201 is a neural network trained according to historical downlink channels.

According to one example of the present disclosure, the terminal may input a downlink control channel to the neural network of the terminal. For example, in a case where the base station is configured with RSs and the RS configuration is available, the base station may transmit the RSs on the downlink control channel. Accordingly, the terminal may input the downlink control channel to the neural network of the terminal, so that the terminal performs channel estimation on the downlink control channel in a subsequent step S202. The downlink control channel herein may be, for example, a Physical Downlink Control CHannel (PDCCH), a Physical Broadcast CHannel (PBCH), or a Physical Control Format Indicator CHannel (PCFICH), and so on. The reference signals herein may be one or more of Channel State Information Reference Signal (CSI-RSs), Primary Synchronization Signals (PSSs)/Secondary Synchronization Signals (SSSs), DMRSs, or Synchronization Signal Blocks (SSBs), and so on.

According to another example of the present disclosure, the terminal may input a downlink data channel to the input layer of the neural network of the terminal. For example, in a case where the base station is configured with the RSs and the RS configuration is unavailable or the base station is not configured with the RSs, the base station does not transmit the downlink reference signals, but transmits service data on the downlink data channel. Accordingly, the terminal may input the downlink data channel to the input layer of the neural network of the terminal, so that the terminal performs channel estimation on the downlink data channel in the subsequent step S202. The downlink data channel herein may be, for example, a Physical Downlink Shared CHannel (PDSCH).

Then, in step S202, the neural network of the terminal processes the input and outputs feedback information. For example, the neural network of the terminal may perform channel estimation on the downlink channel to obtain channel information, and output the channel information as the feedback information from the terminal to the base station. In addition, the "feedback information" herein may also be referred to as feedback information based on the neural network, or channel information encoded by the neural network, or feedback information encoded by the neural network. In addition, the input of the neural network of the terminal may not be limited to the downlink channel in step S201, and may also include other information, for example, historical feedback information of the neural network, and so on.

According to one example of the present disclosure, when the terminal inputs the downlink control channel to the neural network of the terminal in step S201, the terminal may perform channel estimation on the downlink control channel in step S202. For example, the terminal may measure the RS s in the downlink control channel to perform the channel estimation to obtain the feedback information.

According to another example of the present disclosure, when the terminal inputs the downlink data channel to the neural network of the terminal in step S201, the terminal may perform channel estimation on the downlink data channel in step S202. For example, the terminal may decode the service data in the downlink data channel to perform the channel estimation to obtain the feedback information. For another example, the terminal may measure the DMRSs in the downlink data channel to perform the channel estimation to obtain the feedback information.

The above feedback information may be, for example, one or more of Channel State Information (CSI), a Reference Signal Receiving Power (RSRP), a Reference Signal Receiving Quality (RSRQ), a Signal to Interference plus Noise Ratio (SINR), or a Synchronous Signal Block Index (SSB-index), and so on. In addition, the CSI may include one or more of a Channel Quality Indicator (CQI), a Precoding Matrix Indicator (PMI), a Rank Indication (RI), or a CSI-RS Indicator (CRI), and so on.

After step S202, the method 200 may further include step S203: the terminal transmits the feedback information to the base station. The terminal may process (for example, one or more of quantization, coding, or modulation) the feedback information, and then transmit the processed feedback information to the base station.

According to one example of the present disclosure, in step S203, the terminal may quantize the feedback information, and then transmit the quantized feedback information to the base station. For example, the terminal may quantize the feedback information by using a neural network-based codebook, and transmit the quantized feedback information to the base station. Specifically, when the feedback information is binary data, the terminal may quantize the feedback information into one codeword in the neural network-based codebook by using this codebook, and transmit the codeword to the base station. In addition, when the feedback information is a vector or a matrix, the terminal may vectorize the feedback information to one codeword closest to it by using the neural network-based codebook, and transmit the codeword to the base station.

The above neural network-based codebook may be a codebook based on the neural network of the terminal. For example, the neural network-based codebook may be determined according to the output characteristics of the neural network of the terminal. Specifically, in a case where an activation function is used in the output layer of the neural network of the terminal, the neural network-based codebook may be determined according to the activation function used in the output layer of the neural network of the terminal. For example, the neural network-based codebook may be determined according to a value range and a value probability density function of the activation function output of the output layer of the neural network of the terminal, or may be determined according to the value range of the output and a slope of the activation function. For example, in a region with a higher probability of the activation function output, more codewords (that is, more quantization intervals) may be set; on the other hand, in a region with a lower probability of the activation function output, fewer codewords (that is, fewer quantization intervals) may be set. In an example where the activation function is a Sigmoid function, more codewords may be set in a region with a larger slope of the Sigmoid function, and only one codeword may be set in a region with a smaller slope of the Sigmoid function. In an example where the activation function is a ReLU function, codewords may be set in a region where the output of the ReLU function is non-negative, and codewords may not be set in a region where the output of the ReLU function is negative. That is, in the example where the activation function is the ReLU function, the neural network-based codebook may be a quantizer for non-negative data. In addition, in a case where the activation function is not used in the output layer of the neural network of the terminal, the neural network-based codebook may be determined according to the characteristics of the neural network of the terminal. The characteristics of the neural network of the terminal described herein may include at least one of a network type, a network size, and the like of the neural network of the terminal.

In addition, when the output of the activation function of the neural network of the terminal is a digital output (for example, a binary output), according to one example of the present disclosure, in step S203, the terminal may digitally encode and modulate the feedback information, and then transmit the digitally encoded and modulated feedback information to the base station. For example, the terminal may encode and modulate the feedback information, and transmit the encoded and modulated feedback information to the base station.

The encoding and modulation scheme used herein may be determined according to a size of resource blocks (for example, resource blocks designated by the base station to the terminal, which may be referred to as feedback resource blocks) used by the terminal for feeding back to the base station and the number of nodes in the intermediate output layers of the neural network of the terminal. For example, there is a corresponding relationship among the size of the resource blocks used by the terminal for feeding back to the base station, the number of nodes in the intermediate output layers of the neural network of the terminal, and the encoding and modulation scheme. The terminal may determine the encoding and modulation scheme according to the size of the resource blocks used by the terminal for feeding back to the base station, the number of nodes in the intermediate output layers of the neural network of the terminal, and the above corresponding relationship. The above corresponding relationship may be in a form of a table, and may be stored in the terminal in advance.

In addition, the encoding and modulation scheme used herein may be existing encoding and modulation schemes, for example, modulation modes such as Quadrature Phase Shift Keying (QPSK), Binary Phase Shift Keying (BPSK), 16-Quadrature Amplitude Modulation (QAM) or 64 QAM and so on, and encoding modes such as Turbo, Low-Density Parity-Check (LDPC) or polar and so on.

In addition, when the output of the activation function of the neural network of the terminal is an analog output (for example, an analog signal), according to one example of the present disclosure, in step S203, the terminal may perform analog modulation on the feedback information and then transmit the analog modulated feedback information to the base station. The analog modulation mode used herein may be existing analog modulation modes, for example, Amplitude Modulation (AM), Frequency Modulation (FM), or Phase Modulation (PM), and so on.

In this example, the terminal may also perform filtering and other transformations on the analog modulated feedback information, and then transmit the filtered feedback information to the base station. For example, the terminal may use an analog filter to perform operations such as convolution and/or dispersion on the analog modulated feedback information, and then transmit the operated feedback information to the base station. In this way, the information fed back by the terminal to the base station may be adapted to the size of the feedback resource blocks, and the signal-to-noise ratio of the communication may be improved.

It should be noted that the processing on the feedback information by the terminal is not limited to the quantization, encoding, and modulation and the like described above, and may be a combination of a plurality of the quantization, encoding, and modulation and the like described above. For example, the terminal may quantize the feedback information, then encode and modulate the quantized feedback information, and transmit the encoded and modulated feedback information to the base station.

In addition, it should be appreciated that the processing on the feedback information by the terminal may not be performed with the neural network of the terminal. In this case, the terminal may process the feedback information according to a traditional processing mechanism. Alternatively, the processing on the feedback information by the terminal may be performed with the neural network of the terminal. In this case, the feedback information output by the neural network of the terminal may be the processed feedback information.

In addition, in step S203, the terminal may transmit the feedback information by using the feedback resource blocks. For example, the terminal may map the feedback information to the feedback resource blocks, and then transmit the feedback information on the feedback resource blocks.

In addition, before step S203, the method 200 may further include step S204: the terminal determines whether to transmit the feedback information to the base station. When the terminal determines not to transmit the feedback information to the base station, the terminal may not perform step S203 described above. When the terminal determines to transmit the feedback information to the base station, the terminal may perform step S203 described above.

According to one example of the present disclosure, the terminal may determine whether to transmit the feedback information to the base station without the base station. For example, the terminal may determine whether to transmit the feedback information to the base station according to the output of a specific layer in its own neural network. For example, when the output of a certain layer in the neural network of the terminal is a first value, the terminal may determine not to transmit the feedback information to the base station. When the output of a certain layer in the neural network of the terminal is a second value, the terminal may determine to transmit the feedback information to the base station. Herein, the values of the first value and the second value may be natural numbers. For example, the first value may be 0 and the second value may be 1.

According to another example of the present disclosure, the terminal may determine whether to transmit the feedback information to the base station with the base station. For example, the terminal may determine whether to transmit the feedback information to the base station according to indication information from the base station. For example, the terminal may receive indication information for feeding back the feedback information from the base station. When the indication information does not indicate the terminal to feed back the feedback information to the base station, the terminal may determine not to transmit the feedback information to the base station. When the indication information indicates the terminal to feed back the feedback information to the base station, the terminal may determine to transmit the feedback information to the base station.

In this example, the base station may transmit the above indication information with a lower layer signaling such as a physical layer signaling, Downlink Control Information (DCI), or Media Access Control (MAC) Control Elements (CE) and so on. Accordingly, the terminal may receive the above indication information with the lower layer signaling. In addition, the base station may transmit the above indication information with a higher layer signaling such as Radio Resource Control (RRC) signaling. Accordingly, the terminal may receive the above indication information with the higher layer signaling. In addition, the base station may also transmit the above indication information with System Information (SI), and so on. Accordingly, the terminal may receive the above indication information with the system information.

In addition, other than the feedback information described above, the terminal may determine whether to feedback other information to the base station. Similarly, the terminal may determine whether to transmit other information to the base station without the base station. For example, the terminal may determine whether to transmit other information to the base station according to the output of a specific layer in its own neural network. Alternatively, the terminal may determine whether to transmit other information to the base station with the base station. For example, the terminal may determine whether to transmit other information to the base station according to the indication information from the base station.

The "other information" herein may be traditional feedback information. The traditional feedback information may be information generated according to an existing feedback information feedback mechanism, for example, CSI generated according to an existing CSI feedback mechanism. In this way, the terminal may be triggered to feed back the traditional feedback information to the base station, so that the base station may optimize its own neural network or jointly optimize its own neural network and the neural network of the terminal with the traditional feedback information.

In addition, according to one example of the present disclosure, in a case where the terminal does not receive a feedback indication from the base station, the terminal may determine information to be fed back to the base station by using the neural network of the terminal. For example, the terminal may determine to feed back at least one of the "feedback information" and "other information" (for example, the traditional feedback information) described above to the base station by using the neural network of the terminal.

With the method performed by the terminal according to the embodiments of the present disclosure, the terminal may use its own neural network to process the input to obtain the feedback information, so that the feedback information may be fed back to the base station and used as the input of a specific layer in the neural network of the base station, thereby facilitating the base station to determine transmission configuration information for the terminal.

Figure 3:
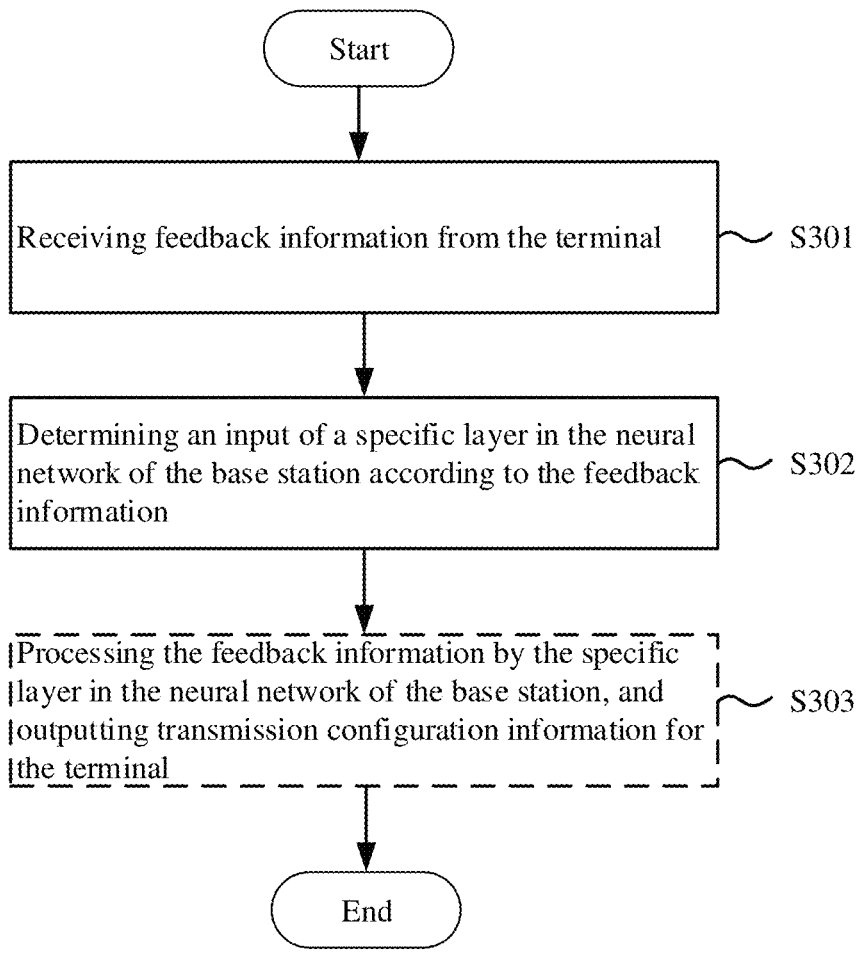
FIG. 3 is a flowchart of a method performed by a base station according to the embodiments of the present disclosure.

Hereinafter, a process in which a base station receives from a terminal an output of a neural network of the terminal according to the embodiments of the present disclosure will be described with reference to FIG. 3. FIG. 3 is a flowchart of a method 300 performed by the base station according to the embodiments of the present disclosure. Since the method 300 has the same details as the method 200 described above with reference to FIG. 2, a detailed description of the same content is omitted herein for simplicity. As shown in FIG. 3, in step S301, the base station receives feedback information from the terminal.

According to one example of the present disclosure, the feedback information in step S301 may be information output by a neural network of the terminal processing an input. For example, the feedback information in step S301 may be information output by the neural network of the terminal performing channel estimation on a downlink control channel. For another example, the feedback information in step S301 may be information output by the neural network of the terminal performing channel estimation on a downlink data channel.

In addition, the feedback information in step S301 may be feedback information processed by the terminal. For example, the feedback information in step S301 may be feedback information that is encoded, modulated, or quantized by the terminal.

Then, in step S302, the base station determines an input of a specific layer in the neural network of the base station according to the feedback information, so that the specific layer processes the feedback information in step S303 below, thereby outputting transmission configuration information for the terminal. For example, the base station may input the feedback information to a specific layer of the neural network of the base station, such as an input layer or an intermediate layer of the neural network of the base station.

Then, after step S302, the method 300 may further include step S303: the specific layer in the neural network of the base station processes the feedback information, and outputs transmission configuration information for the terminal. For example, the specific layer in the neural network of the base station may perform a convolution operation on the feedback information, and output the operation result as the transmission configuration information for the terminal.

The transmission configuration information for the terminal described above may be one or more of transmission beams, transmission resources, the number of transmission streams, encoding and modulation schemes, transmission antennas, transmission ports, or transmission modes for the terminal and so on.

With the method performed by the base station according to the embodiments of the present disclosure, the base station may receive the feedback information from the terminal, which is obtained by the terminal performing the channel estimation on the downlink channel using its own neural network, so that the feedback information may be used as the input of a specific layer in the neural network of the base station, thereby facilitating the base station to determine the transmission configuration information for the terminal.

Figure 4:
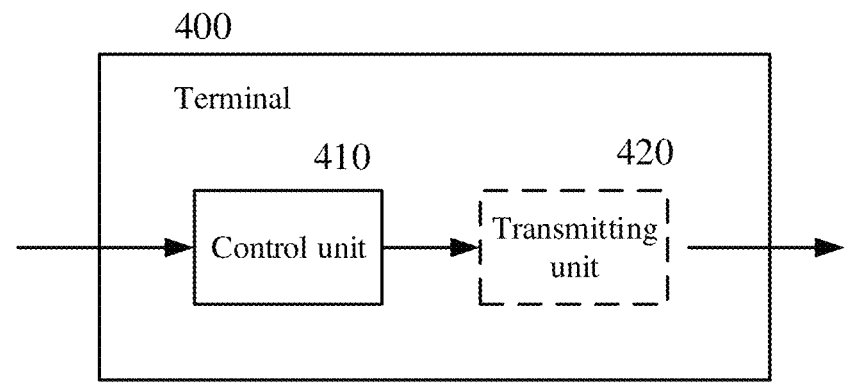
FIG. 4 is a schematic diagram of structure of a terminal according to the embodiments of the present disclosure.

Hereinafter, a terminal according to the embodiments of the present disclosure will be described with reference to FIG. 4. FIG. 4 is a schematic diagram of structure of a terminal 400 according to the embodiments of the present disclosure. Since the function of the terminal 400 is the same as the details of the method described above with reference to FIG. 2, a detailed description of the same content is omitted herein for simplicity. As shown in FIG. 4, the terminal 400 includes: a control unit 410 configured to input a downlink channel to a neural network of the terminal; and the control unit 410 is further configured to control the neural network of the terminal to process the input and output feedback information. In addition to this unit, the terminal 400 may include other components. However, since these components are not related to the content of the embodiments of the present disclosure, their illustration and description are omitted herein.

In the present disclosure, the neural network of the terminal processes the input and outputs the feedback information. For example, the neural network of the terminal may perform channel estimation on the downlink channel to obtain channel information, and output the channel information as the feedback information from the terminal to the base station. In addition, the "feedback information" herein may also be referred to as feedback information based on the neural network, or channel information encoded by the neural network, or feedback information encoded by the neural network. In addition, the input of the neural network of the terminal may not be limited to the downlink channel, and may also include other information, for example, historical feedback information of the neural network, and so on.

According to one example of the present disclosure, the control unit 410 may input a downlink control channel to the neural network of the terminal. For example, in a case where the base station is configured with Reference Signals (RSs) and the RS configuration is available, the base station may transmit the RSs on the downlink control channel. Accordingly, the control unit 410 may input the downlink control channel to the neural network of the terminal, so that the control unit 410 performs channel estimation on the downlink control channel. The downlink control channel herein may be, for example, a Physical Downlink Control CHannel (PDCCH), a Physical Broadcast CHannel (PBCH), or a Physical Control Format Indicator CHannel (PCFICH), and so on. The reference signals herein may be one or more of Channel State Information Reference Signal (CSI-RSs), Primary Synchronization Signals (PSSs)/Secondary Synchronization Signals (SSSs), DMRSs, or Synchronization Signal Blocks (SSBs), and so on.

According to another example of the present disclosure, the control unit 410 may input a downlink data channel to the input layer of the neural network of the terminal. For example, in a case where the base station is configured with RSs and RS configuration is unavailable or the base station is not configured with the RSs, the base station does not transmit the downlink reference signals, but transmits service data on the downlink data channel. Accordingly, the control unit 410 may input the downlink data channel to the input layer of the neural network of the terminal, so that the control unit 410 performs channel estimation on the downlink data channel. The downlink data channel herein may be, for example, a Physical Downlink Shared CHannel (PDSCH).

According to one example of the present disclosure, when the control unit 410 inputs the downlink control channel to the neural network of the terminal, the control unit 410 may perform channel estimation on the downlink control channel. For example, the control unit 410 may measure the RSs in the downlink control channel to perform channel estimation to obtain the feedback information.

According to another example of the present disclosure, when the control unit 410 inputs the downlink data channel to the neural network of the terminal, the control unit 410 may perform channel estimation on the downlink data channel. For example, the control unit 410 may decode service data in the downlink data channel to perform channel estimation to obtain the feedback information. For another example, the control unit 410 may measure the demodulation reference signals (DMRSs) in the downlink data channel to perform the channel estimation to obtain the feedback information.

The above feedback information may be, for example, one or more of a Channel State Information (CSI), a Reference Signal Receiving Power (RSRP), a Reference Signal Receiving Quality (RSRQ), a Signal to Interference plus Noise Ratio (SINR), or a Synchronous Signal Block Index (SSB-index), and so on. In addition, the CSI may include one or more of a Channel Quality Indicator (CQI), a Precoding Matrix Indicator (PMI), a Rank Indication (RI), or a CSI-RS Indicator (CRI), and so on.

The terminal 400 may further include a transmitting unit 420 configured to transmit the feedback information to the base station. The transmitting unit 420 may process (for example, one or more of quantization, encoding, or modulation) the feedback information, and then transmit the processed feedback information to the base station.

According to an example of the present disclosure, the transmitting unit 420 may quantize the feedback information, and then transmit the quantized feedback information to the base station. For example, the transmitting unit 420 may quantize the feedback information by using a neural network-based codebook, and transmit the quantized feedback information to the base station. Specifically, when the feedback information is binary data, the transmitting unit 420 may quantize the feedback information into one codeword in the neural network-based codebook by using this codebook, and transmit the codeword to the base station. In addition, when the feedback information is a vector or a matrix, the transmitting unit 420 may vectorize the feedback information to one codeword closest to it by using the neural network-based codebook, and transmit the codeword to the base station.

The above neural network-based codebook may be a codebook based on the neural network of the terminal. For example, the neural network-based codebook may be determined according to the output characteristics of the neural network of the terminal. Specifically, in a case where an activation function is used in the output layer of the neural network of the terminal, the neural network-based codebook may be determined according to the activation function used in the output layer of the neural network of the terminal. For example, the neural network-based codebook may be determined according to a value range and a value probability density function of the activation function output of the output layer of the neural network of the terminal, or may be determined according to the value range of the output and a slope of the activation function. For example, in a region with a higher probability of the activation function output, more codewords (that is, more quantization intervals) may be set; on the other hand, in a region with a lower probability of the activation function output, fewer codewords (that is, fewer quantization intervals) may be set. In an example where the activation function is a Sigmoid function, more codewords may be set in a region with a larger slope of the Sigmoid function, and only one codeword may be set in a region with a smaller slope of the Sigmoid function. In an example where the activation function is a ReLU function, codewords may be set in a region where the output of the ReLU function is non-negative, and codewords may not be set in a region where the output of the ReLU function is negative. That is, in the example where the activation function is the ReLU function, the neural network-based codebook may be a quantizer for non-negative data. In addition, in a case where the activation function is not used in the output layer of the neural network of the terminal, the neural network-based codebook may be determined according to the characteristics of the neural network of the terminal. The characteristics of the neural network of the terminal described herein may include at least one of a network type, a network size, and the like of the neural network of the terminal.

In addition, when the output of the activation function of the neural network of the terminal is a digital output (for example, a binary output), according to one example of the present disclosure, the transmitting unit 420 may digitally encode and modulate the feedback information, and then transmit the digitally encoded and modulated feedback information to the base station. For example, the transmitting unit 420 may encode and modulate the feedback information, and transmit the encoded and modulated feedback information to the base station.

The encoding and modulation scheme used herein may be determined according to a size of resource blocks (for example, resource blocks designated by the base station to the terminal, which may be referred to as feedback resource blocks) used by the terminal for feeding back to the base station and the number of nodes in the intermediate output layers of the neural network of the terminal. For example, there is a corresponding relationship among the size of the resource blocks used by the terminal for feeding back to the base station, the number of nodes in the intermediate output layers of the neural network of the terminal, and the encoding and modulation scheme. The terminal may determine the encoding and modulation scheme according to the size of the resource blocks used by the terminal for feeding back to the base station, the number of nodes in the intermediate output layers of the neural network of the terminal, and the above corresponding relationship. The above corresponding relationship may be in a form of a table, and may be stored in the terminal in advance.

In addition, the encoding and modulation scheme used herein may be existing encoding and modulation schemes, for example, modulation modes such as Quadrature Phase Shift Keying (QPSK), Binary Phase Shift Keying (BPSK), 16-Quadrature Amplitude Modulation (QAM) or 64 QAM and so on, and encoding modes such as Turbo, Low-Density Parity-Check (LDPC) or polar and so on.

In addition, when the output of the activation function of the neural network of the terminal is an analog output (for example, an analog signal), according to one example of the present disclosure, the transmitting unit 420 may perform analog modulation on the feedback information and then transmit the analog modulated feedback information to the base station. The analog modulation mode used herein may be existing analog modulation modes, for example, Amplitude Modulation (AM), Frequency Modulation (FM), or Phase Modulation (PM), and so on.

In this example, the transmitting unit 420 may also perform filtering on the analog modulated feedback information, and then transmit the filtered feedback information to the base station. For example, the transmitting unit 420 may use an analog filter to perform operations such as convolution and/or dispersion on the analog modulated feedback information, and then transmit the operated feedback information to the base station. In this way, the information fed back by the terminal to the base station may be adapted to the size of the feedback resource blocks, and the signal-to-noise ratio of the communication may be improved.

It should be noted that the processing on the feedback information by the transmitting unit 420 is not limited to the quantization, encoding, and modulation and the like described above, and may be a combination of a plurality of the quantization, encoding, and modulation and the like described above. For example, the transmitting unit 420 may quantize the feedback information, then encode and modulate the quantized feedback information, and transmit the encoded and modulated feedback information to the base station.

In addition, it should be appreciated that the processing on the feedback information by the transmitting unit 420 may not be performed with the neural network of the terminal. In this case, the transmitting unit 420 may process the feedback information according to a traditional processing mechanism. Alternatively, the processing on the feedback information by the transmitting unit 420 may be performed with the neural network of the terminal. In this case, the feedback information output by the neural network of the terminal may be the processed feedback information.

In addition, the transmitting unit 420 may transmit the feedback information by using the feedback resource blocks. For example, the transmitting unit 420 may map the feedback information to the feedback resource blocks, and then transmit the feedback information on the feedback resource blocks.

In addition, the control unit 410 may determine whether to transmit the feedback information to the base station. When the control unit 410 determines not to transmit the feedback information to the base station, the transmitting unit 420 may not perform the operations described above. When the control unit 410 determines to transmit the feedback information to the base station, the transmitting unit 420 may perform the operations described above.

According to one example of the present disclosure, the control unit 410 may determine whether to transmit the feedback information to the base station without the base station. For example, the control unit 410 may determine whether to transmit the feedback information to the base station according to the output of a specific layer in its own neural network. For example, when the output of a certain layer in the neural network of the terminal is a first value, the control unit 410 may determine not to transmit the feedback information to the base station. When the output of a certain layer in the neural network of the terminal is a second value, the control unit 410 may determine to transmit the feedback information to the base station. Herein, the values of the first value and the second value may be natural numbers. For example, the first value may be 0 and the second value may be 1.

According to another example of the present disclosure, the control unit 410 may determine whether to transmit the feedback information to the base station with the base station. For example, the control unit 410 may determine whether to transmit the feedback information to the base station according to indication information from the base station. For example, the terminal may further include a receiving unit (not shown in the figure) configured to receive indication information for feeding back the feedback information from the base station. When the indication information does not indicate the terminal to feed back the feedback information to the base station, the control unit 410 may determine not to transmit the feedback information to the base station. When the indication information indicates the terminal to feed back the feedback information to the base station, the control unit 410 may determine to transmit the feedback information to the base station.

In this example, the base station may transmit the above indication information with a lower layer signaling such as a physical layer signaling, Downlink Control Information (DCI), or Media Access Control (MAC) Control Elements (CE) and so on. Accordingly, the receiving unit of the terminal may receive the above indication information with the lower layer signaling. In addition, the base station may transmit the above indication information with a higher layer signaling such as Radio Resource Control (RRC) signaling. Accordingly, the receiving unit of the terminal may receive the above indication information with the higher layer signaling. In addition, the base station may also transmit the above indication information with System Information (SI), and so on. Accordingly, the receiving unit of the terminal may receive the above indication information with the system information.

In addition, other than the feedback information described above, the control unit 410 may determine whether to feedback other information to the base station. Similarly, the control unit 410 may determine whether to transmit other information to the base station without the base station. For example, the control unit 410 may determine whether to transmit other information to the base station according to the output of a specific layer in its own neural network. Alternatively, the control unit 410 may determine whether to transmit other information to the base station with the base station. For example, the control unit 410 may determine whether to transmit other information to the base station according to the indication information from the base station.

The "other information" herein may be traditional feedback information. The traditional feedback information may be information generated according to an existing feedback information feedback mechanism, for example, CSI generated according to an existing CSI feedback mechanism. In this way, the terminal may be triggered to feed back the traditional feedback information to the base station, so that the base station may optimize its own neural network or jointly optimize its own neural network and the neural network of the terminal with the traditional feedback information.

With the terminal of the embodiments of the present disclosure, the terminal may use its own neural network to process the input to obtain the feedback information, so that the feedback information may be fed back to the base station and used as the input of a specific layer in the neural network of the base station, thereby facilitating the base station to determine transmission configuration information for the terminal.

Figure 5:
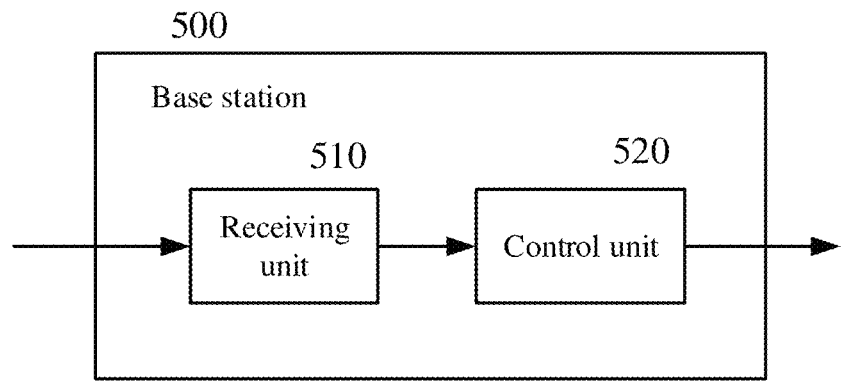
FIG. 5 is a schematic diagram of structure of a base station according to the embodiments of the present disclosure.

Hereinafter, a base station according to the embodiments of the present disclosure will be described with reference to FIG. 5. FIG. 5 is a schematic diagram of structure of a base station 500 according to the embodiments of the present disclosure. Since the function of the base station 500 is the same as the details of the method described above with reference to FIG. 3, a detailed description of the same content is omitted herein for simplicity. As shown in FIG. 5, the base station 500 includes: a receiving unit 510 configured to receive feedback information from a terminal; and a control unit 520 configured to determine an input of a specific layer in a neural network of the base station according to the feedback information. In addition to these two units, the base station 500 may include other components. However, since these components are not related to the content of the embodiments of the present disclosure, their illustration and description are omitted herein.

According to one example of the present disclosure, the feedback information may be information outputted by a neural network of the terminal by processing an input. For example, the feedback information may be information output by the neural network of the terminal performing channel estimation on a downlink control channel. For another example, the feedback information may be information output by the neural network of the terminal performing channel estimation on a downlink data channel.

In addition, the feedback information may be feedback information processed by the terminal. For example, the feedback information may be feedback information that is encoded, modulated, or quantized by the terminal.

In addition, the control unit 520 determines an input of a specific layer in the neural network of the base station according to the feedback information, so that the specific layer processes the feedback information to output transmission configuration information for the terminal. For example, the control unit 520 may input the feedback information to a specific layer of the neural network of the base station, such as an input layer or an intermediate layer of the neural network of the base station.

In addition, the control unit 520 may control the specific layer in the neural network of the base station to process the feedback information and output transmission configuration information for the terminal. For example, the specific layer in the neural network of the base station may perform a convolution operation on the feedback information, and output the operation result as the transmission configuration information for the terminal.

The transmission configuration information for the terminal described above may be one or more of transmission beams, transmission resources, the number of transmission streams, encoding and modulation schemes, transmission antennas, transmission ports, or transmission modes for the terminal and so on.

With the base station in the embodiments of the present disclosure, the base station may receive the feedback information from the terminal, which is obtained by the terminal performing the channel estimation on the downlink channel using its own neural network, so that the feedback information may be used as the input of a specific layer in the neural network of the base station, thereby facilitating the base station to determine the transmission configuration information for the terminal.

Figure 6:
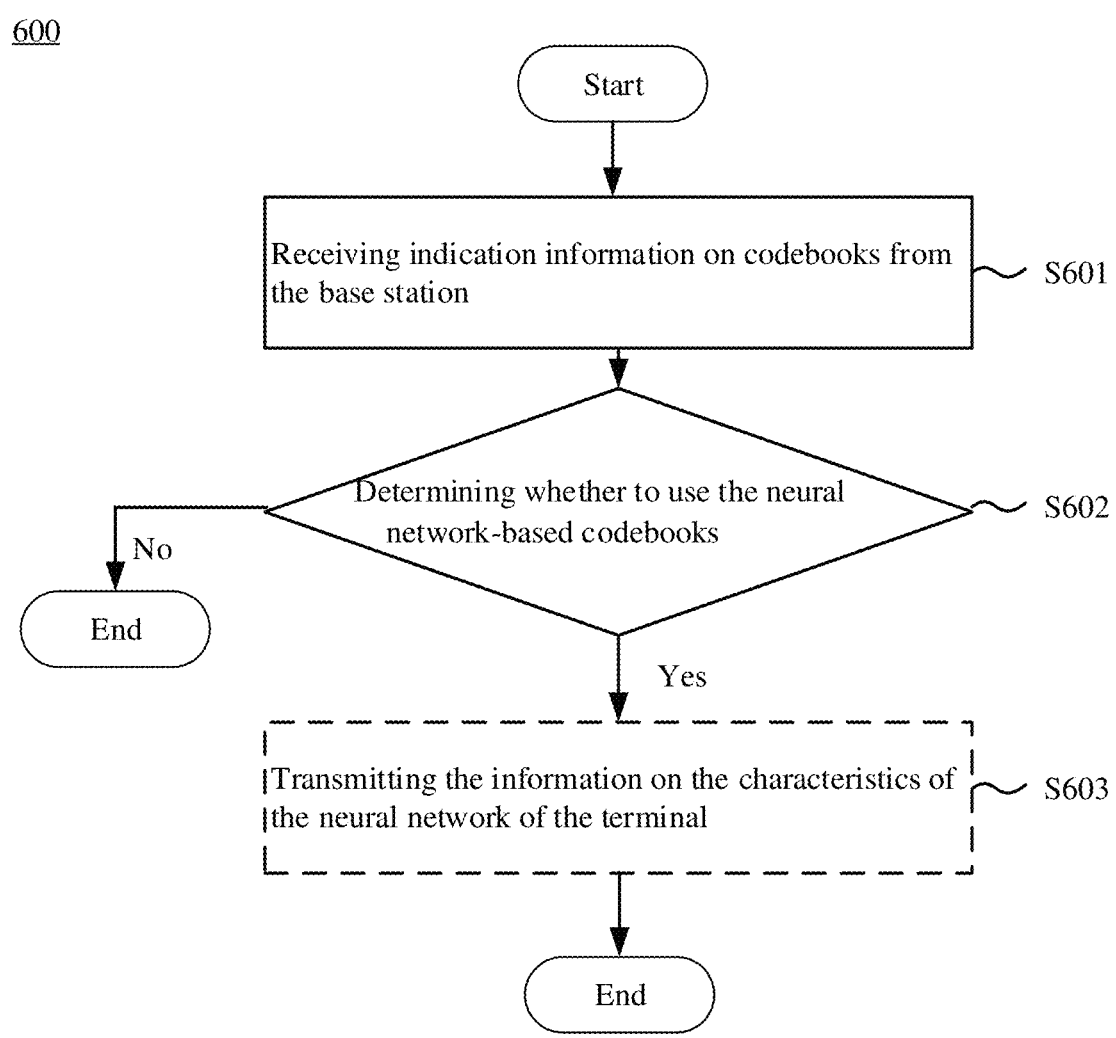
FIG. 6 is a flowchart of a method performed by a terminal according to another embodiment of the present disclosure.

Returning to FIG. 1, in the wireless communication system shown in FIG. 1, the base station 110 and the terminal 120 may use traditional codebooks (for example, a NR codebook) or neural network-based codebooks when communicating. An embodiment of determining whether to use neural network-based codebooks when a base station and a terminal communicate with each other will be described with reference to FIGS. 6-9. FIG. 6 is a flowchart of a method 600 performed by a terminal according to another embodiment of the present disclosure. As shown in FIG. 6, in step S601, the terminal receives indication information on codebooks from the base station, where the indication information indicates whether the terminal uses the neural network-based codebooks. Then, in step S602, the terminal determines whether to use the neural network-based codebooks according to the indication information.

According to one example of the present disclosure, the indication information on the codebooks in step S601 may be generated by the base station according to its own support capability for a neural network and the terminal's support capability for a neural network. For example, when a neural network is deployed at the base station and a neural network is deployed at the terminal, the base station may generate the indication information on the codebooks, and the indication information indicates the terminal to use the neural network-based codebooks. Accordingly, in step S602, the terminal may determine to use the neural network-based codebooks. As another example, when no neural network is deployed at the base station or the terminal, the base station may generate the indication information on the codebooks, and the indication information indicates the terminal not to use the neural network-based codebooks. Accordingly, in step S602, the terminal may determine not to use the neural network-based codebooks.

In addition, according to one example of the present disclosure, the indication information on the codebooks in step S601 may also indicate whether the terminal uses the traditional codebooks. For example, when a neural network is deployed at the base station and a neural network is deployed at the terminal, the base station may generate indication information on the codebooks, and the indication information indicates the terminal not to use the traditional codebooks. Accordingly, in step S602, the terminal determines not to use the traditional codebooks. As another example, when no neural network is deployed at the base station or the terminal, the base station may generate indication information on the codebooks, and the indication information indicates the terminal to use the traditional codebooks. Accordingly, in step S602, the terminal determines to use the traditional codebooks.

In addition, according to one example of the present disclosure, the indication information on the codebooks in step S601 may further indicate whether the terminal uses the neural network-based codebooks and the traditional codebooks. For example, when a neural network is deployed at the base station and a neural network is deployed at the terminal, the base station may generate indication information on the codebooks, and the indication information indicates the terminal to use one or both of the neural network-based codebooks and the traditional codebooks. Accordingly, in step S602, the terminal determines to use one or both of the neural network-based codebooks and the traditional codebooks.

In addition, it should be noted that in the above example, one piece of indication information (i.e., information on codebooks) is used to indicate whether the terminal uses the neural network-based codebooks and whether the terminal uses the traditional codebooks. The present disclosure is not limited to this. For example, two pieces of indication information may be used to indicate whether the terminal uses the neural network-based codebooks and whether the terminal uses the traditional codebooks, respectively. For example, first indication information may be used to indicate whether the terminal uses the neural network-based codebooks, and second indication information may be used to indicate whether the terminal uses the traditional codebooks.

In addition, according to one example of the present disclosure, the base station may transmit the indication information on the codebooks with lower layer signaling such as physical layer signaling, DCI, or MAC CE. Accordingly, in step S601, the terminal may receive the indication information on the codebooks with the lower layer signaling. In addition, the base station may transmit the indication information on the codebooks with higher layer signaling such as RRC signaling. Accordingly, in step S601, the terminal may receive the indication information on the codebooks with the higher layer signaling. In addition, the base station may also transmit the indication information on the codebooks with SI or the like. Accordingly, in step S601, the terminal may receive the indication information on the codebooks with the system information.

In addition, according to one example of the present disclosure, the above neural network-based codebooks may be related to neural network characteristics. For example, the above neural network-based codebooks may be information on the characteristics of the neural network of the terminal, such as a set of parameters related to the characteristics of the neural network of the terminal. The information on the characteristics of the neural network of the terminal described herein may include information on at least one of a network type and a network size of the neural network of the terminal.

In addition, according to one example of the present disclosure, the above neural network-based codebooks may be defined by communication standards (for example, 3GPP standards). In this case, the terminal may store the neural network-based codebooks in advance. Alternatively, the above neural network-based codebooks may be configured by the base station for the terminal. For example, the above neural network-based codebooks may be selected by the base station from a plurality of neural network-based codebooks. In this case, the terminal may receive configuration information of the neural network-based codebooks from the base station, thereby obtaining the neural network-based codebooks.

In addition, according to one example of the present disclosure, the above neural network-based codebooks may be determined according to an output characteristic of the neural network of the terminal. Specifically, in a case where an activation function is used in the output layer of the neural network of the terminal, the neural network-based codebooks may be determined according to the activation function used in the output layer of the neural network of the terminal. For example, the neural network-based codebooks may be determined according to a value range and a value probability density function of the activation function output of the output layer of the neural network of the terminal, or may be determined according to the value range of the output and a slope of the activation function. For example, in a region with a higher probability of the activation function output, more codewords (that is, more quantization intervals) may be set; on the other hand, in a region with a lower probability of the activation function output, fewer codewords (that is, fewer quantization intervals) may be set. In an example where the activation function is a Sigmoid function, more codewords may be set in a region with a larger slope of the Sigmoid function, and only one codeword may be set in a region with a smaller slope of the Sigmoid function. In an example where the activation function is a ReLU function, codewords may be set in a region where the output of the ReLU function is non-negative, and codewords may not be set in a region where the output of the ReLU function is negative. That is, in the example where the activation function is the ReLU function, the neural network-based codebooks may be quantizers for non-negative data. In addition, in a case where the activation function is not used in the output layer of the neural network of the terminal, the neural network-based codebooks may be determined according to the characteristics of the neural network of the terminal. The characteristics of the neural network characteristics of the terminal described herein may include at least one of a network type, a network size, and the like of the neural network of the terminal.

In addition, before or after step S601, the method 600 may further include step S603: the terminal transmits the information on the characteristics of the neural network of the terminal to the base station. For example, before step S601, the terminal may transmit the information on the characteristics of the neural network of the terminal to the base station, so that the base station selects a codebook for the terminal from a plurality of neural network-based codebooks according to the characteristics of the neural network of the terminal. As another example, after step S601, when the terminal determines to use the neural network-based codebooks, the terminal may transmit the information on the characteristics of the neural network of the terminal to the base station, so that the base station updates the codebooks for the terminal.

In addition, when the terminal determines to use the neural network-based codebooks in step S602, the method 600 may further include: the terminal quantizes the feedback information by using the neural network-based codebooks, and transmits the quantized feedback information to the base station. For example, when the feedback information is binary data, the terminal may quantize the feedback information into one codeword in the neural network-based codebooks by using the codebooks, and transmit the codeword to the base station. In addition, when the feedback information is a vector or a matrix, the terminal may vectorize the feedback information to one codeword closest to it by using the neural network-based codebooks, and transmit the codeword to the base station.

In addition, when the terminal determines to use the neural network-based codebooks in step S602, the method 600 may further include: the terminal receives update information on the neural network of the terminal from the base station, where the update information is information obtained after the base station quantizes initial update information by using the neural network-based codebooks. For example, the base station may quantize the initial update information by using the neural network-based codebooks to obtain quantized update information, and transmit the quantized update information to the terminal. Accordingly, the terminal receives the quantized update information from the base station, so as to update the neural network of the terminal.

In addition, when the terminal determines to use the neural network-based codebook in step S602, the method 600 may further include: the terminal receives update information on the codebooks from the base station. For example, when the number of terminals in the wireless communication system increases, interference between the terminals increases, so that a channel quality between the base station and a specific terminal changes. In this case, codebooks configured by the base station for the specific terminal may no longer be applicable to the current channel quality, so the base station may notify the terminal to update the codebooks. For example, the base station may generate the update information on the codebooks, and accordingly, the terminal may receive the update information on the codebooks from the base station, so as to update the codebooks for the terminal.

In this example, the above update information may indicate the terminal to switch between the traditional codebooks and the neural network-based codebooks. For example, the above update information may indicate the terminal to switch from the traditional codebooks to the neural network-based codebooks. As another example, the above update information may indicate the terminal to switch from the neural network-based codebooks to the traditional codebooks.

In addition, in this example, the above update information may also indicate the terminal to switch among a plurality of traditional codebooks. For example, the above update information may indicate the terminal to switch from one traditional codebook to another traditional codebook. Alternatively, the above update information may also indicate the terminal to switch among a plurality of neural network-based codebooks. For example, the above update information may indicate the terminal to switch from one neural network-based codebook to another neural network-based codebook.

With the method performed by the terminal according to the embodiments of the present disclosure, the terminal may determine whether to use the neural network-based codebooks with the indication from the base station, thereby making the communication between the base station and the terminal more intelligent and efficient.

Figure 7:
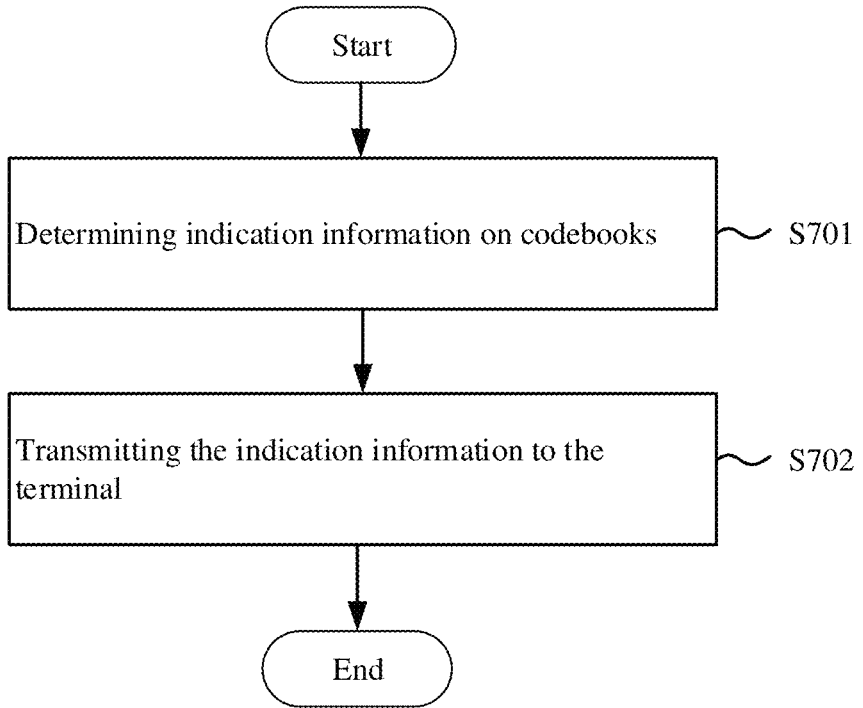
FIG. 7 is a flowchart of a method performed by a base station according to another embodiment of the present disclosure.

Hereinafter, a flowchart of a method performed by a base station according to another embodiment of the present disclosure will be described with reference to FIG. 7. FIG. 7 is a flowchart of a method 700 performed by the base station according to the embodiments of the present disclosure. Since the method 700 has the same details as the method 600 described above with reference to FIG. 6, a detailed description of the same content is omitted herein for simplicity. As shown in FIG. 7, in step S701, the base station determines indication information on codebooks, where the indication information indicates whether a terminal uses neural network-based codebooks.

According to one example of the present disclosure, the base station may determine the indication information on the codebooks according to its own support capability for a neural network and the terminal's support capability for a neural network. For example, when a neural network is deployed at the base station and a neural network is deployed at the terminal, the base station may generate the indication information on the codebooks, and the indication information indicates the terminal to use the neural network-based codebooks. As another example, when no neural network is deployed at the base station or the terminal, the base station may generate the indication information on the codebooks, and the indication information indicates the terminal not to use the neural network-based codebooks.

In addition, according to one example of the present disclosure, the indication information on the codebooks in step S701 may also indicate whether the terminal uses the traditional codebooks. For example, when a neural network is deployed at the base station and a neural network is deployed at the terminal, the base station may generate indication information on the codebooks, and the indication information indicates the terminal not to use the traditional codebooks. As another example, when no neural network is deployed at the base station or the terminal, the base station may generate indication information on the codebooks, and the indication information indicates the terminal to use the traditional codebooks.

Then, in step S702, the base station transmits the indication information to the terminal. According to one example of the present disclosure, the base station may transmit the indication information on the codebooks with lower layer signaling such as physical layer signaling, DCI, or MAC CE. In addition, the base station may transmit the indication information on the codebooks with higher layer signaling such as RRC signaling. In addition, In addition, the base station may also transmit the indication information on the codebooks with SI or the like.

With the method performed by the base station in the embodiments of the present disclosure, the base station may transmit to the terminal the indication of whether to use the neural network-based codebooks, so that the terminal may determine whether to use the neural network-based codebooks with the indication from the base station, thereby making the communication between the base station and the terminal more intelligent and efficient.

Figure 8:
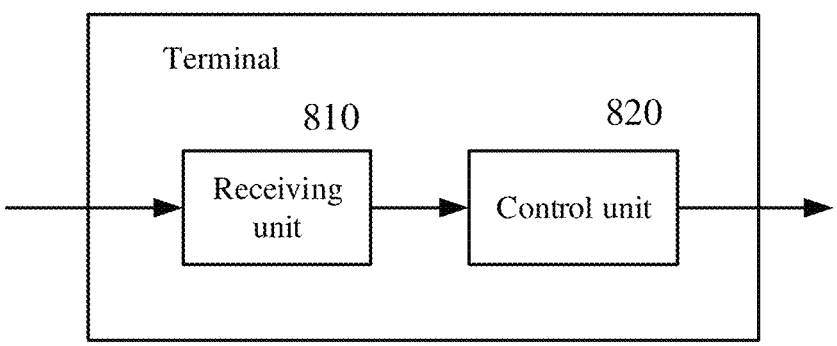
FIG. 8 is a schematic diagram of structure of a terminal according to another embodiment of the present disclosure.

Hereinafter, a terminal according to another embodiment of the present disclosure will be described with reference to FIG. 8. FIG. 8 is a schematic diagram of structure of a terminal 800 according to another embodiment of the present disclosure. Since the function of the terminal 800 is the same as the details of the method described above with reference to FIG. 6, a detailed description of the same content is omitted herein for simplicity. As shown in FIG. 8, the terminal 800 includes: a receiving unit 810 configured to receive indication information on codebooks from a base station, where the indication information indicates whether the terminal uses neural network-based codebooks; and a control unit 820 configured to determine whether to use the neural network-based codebooks according to the indication information. In addition to these two units, the terminal 800 may include other components, however, since these components are not related to the content of the embodiments of the present disclosure, their illustration and description are omitted here.

According to one example of the present disclosure, the indication information on the codebooks may be generated by the base station according to its own support capability for a neural network and the terminal's support capability for a neural network. For example, when a neural network is deployed at the base station and a neural network is deployed at the terminal, the base station may generate the indication information on the codebooks, and the indication information indicates the terminal to use the neural network-based codebooks. Accordingly, the control unit 820 may determine to use the neural network-based codebooks. As another example, when no neural network is deployed at the base station or the terminal, the base station may generate the indication information on the codebooks, and the indication information indicates the terminal not to use the neural network-based codebooks. Accordingly, the control unit 820 may determine not to use the neural network-based codebooks.

In addition, according to one example of the present disclosure, the indication information on the codebooks may also indicate whether the terminal uses the traditional codebooks. For example, when a neural network is deployed at the base station and a neural network is deployed at the terminal, the base station may generate indication information on the codebooks, and the indication information indicates the terminal not to use the traditional codebooks. Accordingly, the control unit 820 determines not to use the traditional codebooks. As another example, when no neural network is deployed at the base station or the terminal, the base station may generate indication information on the codebooks, and the indication information indicates the terminal to use the traditional codebooks. Accordingly, the control unit 820 determines to use the traditional codebooks.

In addition, according to one example of the present disclosure, the base station may transmit the indication information on the codebooks with lower layer signaling such as physical layer signaling, DCI, or MAC CE. Accordingly, the receiving unit 810 may receive the indication information on the codebooks with the lower layer signaling. In addition, the base station may transmit the indication information on the codebooks with higher layer signaling such as RRC signaling. Accordingly, the receiving unit 810 may receive the indication information on the codebooks with the higher layer signaling. In addition, the base station may also transmit the indication information on the codebooks with SI or the like. Accordingly, the receiving unit 810 may receive the indication information on the codebooks with the system information.

In addition, according to one example of the present disclosure, the above neural network-based codebooks may be related to neural network characteristics. For example, the above neural network-based codebooks may be information on the characteristics of the neural network of the terminal, such as a set of parameters related to the characteristics of the neural network of the terminal. The information on the characteristics of the neural network of the terminal described herein may include information on at least one of a network type and a network size of the neural network of the terminal.

In addition, according to one example of the present disclosure, the above neural network-based codebooks may be defined by communication standards (for example, 3GPP standards). In this case, the terminal may store the neural network-based codebooks in advance. Alternatively, the above neural network-based codebooks may be configured by the base station for the terminal. For example, the above neural network-based codebooks may be selected by the base station from a plurality of neural network-based codebooks. In this case, the terminal may receive configuration information of the neural network-based codebooks from the base station, thereby obtaining the neural network-based codebooks.

In addition, according to one example of the present disclosure, the neural network-based codebooks may be determined according to an output characteristic of the neural network of the terminal. Specifically, in a case where an activation function is used in the output layer of the neural network of the terminal, the neural network-based codebooks may be determined according to the activation function used in the output layer of the neural network of the terminal. For example, the neural network-based codebooks may be determined according to a value range and a value probability density function of the activation function output of the output layer of the neural network of the terminal, or may be determined according to the value range of the output and a slope of the activation function. For example, in a region with a higher probability of the activation function output, more codewords (that is, more quantization intervals) may be set; on the other hand, in a region with a lower probability of the activation function output, fewer codewords (that is, fewer quantization intervals) may be set. In an example where the activation function is a Sigmoid function, more codewords may be set in a region with a larger slope of the Sigmoid function, and only one codeword may be set in a region with a smaller slope of the Sigmoid function. In an example where the activation function is a ReLU function, codewords may be set in a region where the output of the ReLU function is non-negative, and codewords may not be set in a region where the output of the ReLU function is negative. That is, in the example where the activation function is the ReLU function, the neural network-based codebooks may be quantizers for non-negative data. In addition, in a case where the activation function is not used in the output layer of the neural network of the terminal, the neural network-based codebooks may be determined according to the characteristics of the neural network of the terminal. The characteristics of the neural network characteristics of the terminal described herein may include at least one of a network type, a network size, and the like of the neural network of the terminal.

In addition, the terminal 800 may further include a transmitting unit (not shown in the figure) configured to transmit the information on the characteristics of the neural network of the terminal to the base station. For example, the transmitting unit of the terminal may transmit the information on the characteristics of the neural network of the terminal to the base station, so that the base station selects a codebook for the terminal from a plurality of neural network-based codebooks according to the characteristics of the neural network of the terminal. As another example, when the terminal determines to use the neural network-based codebooks, the transmitting unit of the terminal may transmit the information on the characteristics of the neural network of the terminal to the base station, so that the base station updates the codebooks for the terminal.

In addition, when the control unit 820 determines to use the neural network-based codebooks, the control unit 820 may quantize the feedback information by using the neural network-based codebooks and transmit the quantized feedback information to the base station. For example, when the feedback information is binary data, the control unit 820 may quantize the feedback information into one codeword in the neural network-based codebooks by using the codebooks, and transmit the codeword to the base station. In addition, when the feedback information is a vector or a matrix, the control unit 820 may vectorize the feedback information to one codeword closest to it by using the neural network-based codebooks, and transmit the codeword to the base station.

In addition, when the control unit 820 determines to use the neural network-based codebooks, the receiving unit 810 may receive update information on the neural network of the terminal from the base station, where the update information is information obtained after the base station quantizes initial update information by using the neural network-based codebooks. For example, the base station may quantize the initial update information by using the neural network-based codebooks to obtain quantized update information, and transmit the quantized update information to the terminal. Accordingly, the terminal receives the quantized update information from the base station, so as to update the neural network of the terminal.

In addition, when the control unit 820 determines to use the neural network-based codebook, the receiving unit 810 may receive updated information on the codebooks from the base station. For example, when the number of terminals in the wireless communication system increases, interference between the terminals increases, so that a channel quality between the base station and a specific terminal changes. In this case, codebooks configured by the base station for the specific terminal may no longer be applicable to the current channel quality, so the base station may notify the terminal to update the codebooks. For example, the base station may generate the update information on the codebooks, and accordingly, the terminal may receive the update information on the codebooks from the base station, so as to update the codebooks for the terminal.

In this example, the above update information may indicate the terminal to switch between the traditional codebook and the neural network-based codebooks. For example, the above update information may indicate the terminal to switch from the traditional codebooks to the neural network-based codebooks. As another example, the above update information may indicate the terminal to switch from the neural network-based codebooks to the traditional codebooks.

In addition, in this example, the above update information may also indicate the terminal to switch among a plurality of traditional codebooks. For example, the above update information may indicate the terminal to switch from one traditional codebook to another traditional codebook. Alternatively, the above update information may also indicate the terminal to switch among a plurality of neural network-based codebooks. For example, the above update information may indicate the terminal to switch from one neural network-based codebook to another neural network-based codebook.

With the terminal in the embodiments of the present disclosure, the terminal may determine whether to use the neural network-based codebooks with the indication from the base station, thereby making the communication between the base station and the terminal more intelligent and efficient.

Figure 9:
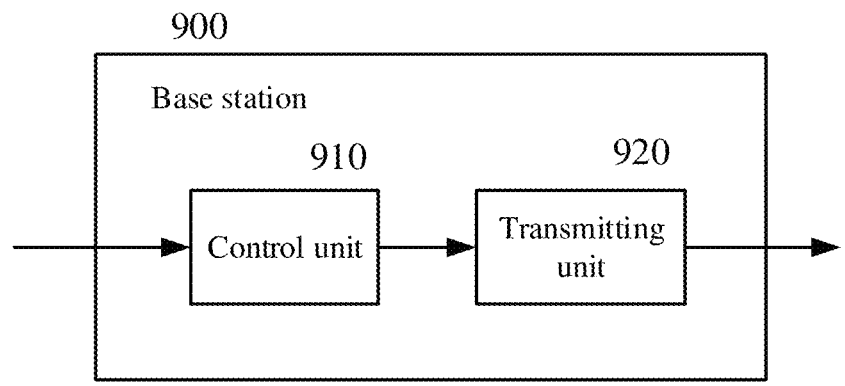
FIG. 9 is a schematic diagram of structure of a base station according to another embodiment of the present disclosure.

Hereinafter, a base station according to another embodiment of the present disclosure will be described with reference to FIG. 9. FIG. 9 is a schematic diagram of structure of a base station 900 according to another embodiment of the present disclosure. Since the function of the base station 900 is the same as the details of the method described above with reference to FIG. 7, a detailed description of the same content is omitted herein for simplicity. As shown in FIG. 9, the base station 900 includes: a control unit 910 configured to determine indication information on codebooks, where the indication information indicates whether a terminal uses neural network-based codebooks; and a transmitting unit 920 configured to transmit the indication information to the terminal. In addition to these two units, the base station 900 may include other components. However, since these components are not related to the content of the embodiments of the present disclosure, their illustration and description are omitted herein.

According to one example of the present disclosure, the control unit 910 may determine the indication information on the codebooks according to its own support capability for a neural network and the terminal's support capability for a neural network. For example, when a neural network is deployed at the base station and a neural network is deployed at the terminal, the control unit 910 may generate the indication information on the codebooks, and the indication information indicates the terminal to use the neural network-based codebooks. As another example, when no neural network is deployed at the base station or the terminal, the control unit 910 may generate the indication information on the codebooks, and the indication information indicates the terminal not to use the neural network-based codebooks.

In addition, according to one example of the present disclosure, the indication information on the codebooks may also indicate whether the terminal uses one traditional codebooks. For example, when a neural network is deployed at one base station and a neural network is deployed at the terminal, the control unit 910 may generate the indication information on the codebooks, and the indication information indicates the terminal not to use the traditional codebooks. As another example, when no neural network is deployed at the base station or the terminal, the control unit 910 may generate the indication information on the codebooks, and the indication information indicates the terminal to use the traditional codebooks.

In addition, according to one example of the present disclosure, the transmitting unit 920 may transmit the indication information on the codebooks with lower layer signaling such as physical layer signaling, DCI, or MAC CE. In addition, the transmitting unit 920 may transmit the indication information on the codebooks with higher layer signaling such as RRC signaling. In addition, the transmitting unit 920 may also transmit the indication information on the codebooks with an SI or the like.

With the base station in the embodiments of the present disclosure, the base station may transmit to the terminal the indication of whether to use the neural network-based codebooks, so that the terminal may determine whether to use the neural network-based codebooks with the indication from the base station, thereby making the communication between the base station and the terminal more intelligent and efficient.

<Hardware Structure>

It should be noted that block diagrams used for the illustration of the above embodiments represent functional blocks in functional units. These functional blocks (components) are realized by any combination of hardware and/or software. In addition, the means for implementing respective function blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 10:
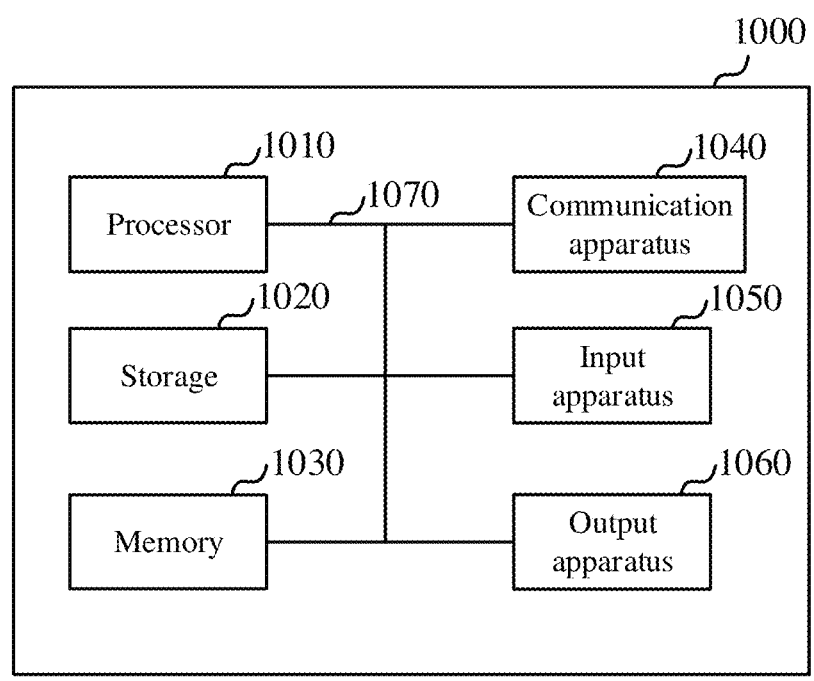
FIG. 10 is a schematic diagram of hardware structures of related devices according to embodiments of the present disclosure.

For example, the device (such as a first communication device, a second communication device or flying user terminal and so on) in one embodiment of the present disclosure may function as a computer that executes the processes of the radio communication method of the present disclosure. FIG. 10 is a schematic diagram of a hardware structure of a related device 1000 (base station or user terminal) according to an embodiment of the present disclosure. The above described device 1000 (base station or user terminal) may be physically designed as a computer apparatus including a processor 1010, a storage 1020, a memory 1030, a communication apparatus 1040, an input apparatus 1050, an output apparatus 1060, and a bus 1070 and the like.

It should be noted that, in the following description, the word "apparatus" may be replaced by "circuit", "device", "unit" and so on. It should be noted that the hardware structure of a user terminal and base station may be designed to include one or more of each apparatus shown in the drawings, or may be designed not to include part of the apparatus.

For example, although only one processor 1010 is shown, a plurality of processors may be provided. Furthermore, processes may be implemented with one processor, or processes may be implemented either simultaneously or in sequence, or in different manners, on two or more processors. It should be noted that the processor 1010 may be implemented with one or more chips.

Each function of the device 1000 is implemented by reading predetermined software (program) on hardware such as the processor 1010 and the memory 1020, so as to make the processor 1010 perform calculations, and by controlling the communication carried out by the communication apparatus 1040, and the reading and/or writing of data in the memory 1020 and the storage 1030.

The processor 1010 may control the whole computer by, for example, running an operating system. The processor 1010 may be configured with a central processing unit (CPU), which includes interfaces with peripheral apparatus, control apparatus, computing apparatus, a register and so on. For example, the above described determination unit, adjustment unit, and the like may be implemented by the processor 1010.

Furthermore, the processor 1010 reads programs (program codes), software modules or data, from the storage 1030 and/or the communication apparatus 1040, into the memory 1020, and executes various processes according to these. As for the programs, programs to allow computers to execute at least part of the operations of the above-described embodiments may be used. For example, it may be implemented by a control program stored in the memory 1020 and operated by the processor 1010, and may also be implemented similarly for other function blocks.

The memory 1020 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1020 may be referred to as a "register", a "cache", a "main memory" (primary storage apparatus) and so on. The memory 1020 can store executable programs (program codes), software modules and so on for implementing the methods according to embodiments of the present disclosure.

The storage 1030 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1030 may be referred to as "secondary storage apparatus."

The communication apparatus 1040 is hardware (transmitting/receiving device) for allowing inter-computer communication by using wired and/or wireless networks, and may be referred to as, for example, a "network device", a "network controller", a "network card", a "communication module" and so on. The communication apparatus 1040 may be configured to include a high frequency switch, a duplexer, a filter, a frequency synthesizer and so on in order to realize, for example, frequency division duplex (FDD) and/or time division duplex (TDD). For example, the above described transmitting unit, receiving unit, and so on, may be implemented by the communication apparatus 1040.

The input apparatus 1050 is an input device for receiving input from the outside (for example, a keyboard, a mouse, a microphone, a switch, a button, a sensor and so on). The output apparatus 1060 is an output device for allowing sending output to the outside (for example, a display, a speaker, an LED (Light Emitting Diode) lamp and so on). It should be noted that the input apparatus 1050 and the output apparatus 1060 may be provided in an integrated structure (for example, a touch panel).

Furthermore, these pieces of apparatus, including the processor 1010, the memory 1020 and so on are connected by the bus 1070 so as to communicate information. The bus 1070 may be formed with a single bus, or may be formed with buses that vary between pieces of apparatus.

Also, the base station and user terminal may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1010 may be installed with at least one of these pieces of hardware.

(Variations)

It should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of "X holds") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into a plurality of smaller areas, and each smaller area can provide communication services with base station subsystems (for example, indoor small base stations (RRHs (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably. A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the functions of base station may be considered as the functions of the user terminal. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 3000, UMB (Ultra Mobile Broadband), IEEE 920.11 (Wi-Fi (registered trademark)), IEEE 920.16 (WiMAX (registered trademark)), IEEE 920.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include", "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

What is claimed is:

1. A terminal comprising:
a controller configured to:
input a signal related to a downlink channel to a neural network of the terminal, and
control the neural network of the terminal to process feedback information; and
a transmitter configured to:
transmit the feedback information to a base station,
encode and modulate the feedback information or analog modulate the feedback information, and
transmit the encoded and modulated or analog modulated feedback information to the base station,
wherein an encoding and modulation scheme used for the feedback information is related to number of nodes in intermediate output layers of the neural network of the terminal, and
wherein the transmitter is configured to encode and modulate the feedback information or to analog modulate the feedback information comprises: the transmitter quantizes the feedback information by using a neural network-based codebook, and transmits quantized feedback information to the base station, the neural network-based codebook is determined according to an activation function used in the output layers of the neural network of the terminal.

2. A base station, comprising:

a receiver configured to receive feedback information from a terminal, wherein the feedback information is encoded and modulated feedback information which is encoded and modulated by the terminal, or analog modulated feedback information which is analog modulated by the terminal, wherein an encoding and modulation scheme used for the feedback information is related to number of nodes in intermediate output layers of the neural network of the terminal; and a controller configured to determine an input of a specific layer in a neural network of the base station according to the feedback information, wherein the feedback information is quantized feedback information which is quantized by using a neural network-based codebook, the neural network-based codebook is determined according to an activation function used in the output layers of the neural network of the terminal.

3. A terminal comprising:

a receiver configured to receive indication information on codebooks from a base station, wherein the indication information indicates whether the terminal uses neural network-based codebooks, the indication information is generated according to the base station's support capability for a neural network and the terminal's support capability for a neural network; and a controller configured to determine whether to use the neural network-based codebooks according to the indication information, wherein the neural network-based codebooks are determined according to an activation function used in the output layers of the neural network of the terminal.

4. The terminal according to claim 3, further including:

a transmitter configured to transmit information on characteristics of the neural network of the terminal to the base station.

5. The terminal according to claim 4, wherein the information on characteristics of the neural network of the terminal includes information on at least one of a network type and a network size of the neural network of the terminal.

6. The terminal according to claim 3, wherein the neural network-based codebooks are related to the characteristics of the neural network.

7. The terminal according to claim 3, wherein the neural network-based codebooks are determined according to output characteristics of the neural network.

\* \* \* \* \*